(No Model.)
E. NORTON.
ART OF SOLDERING CAPS ON FILLED CANS.
No. 395,796. Patented Jan. 8, 1889.
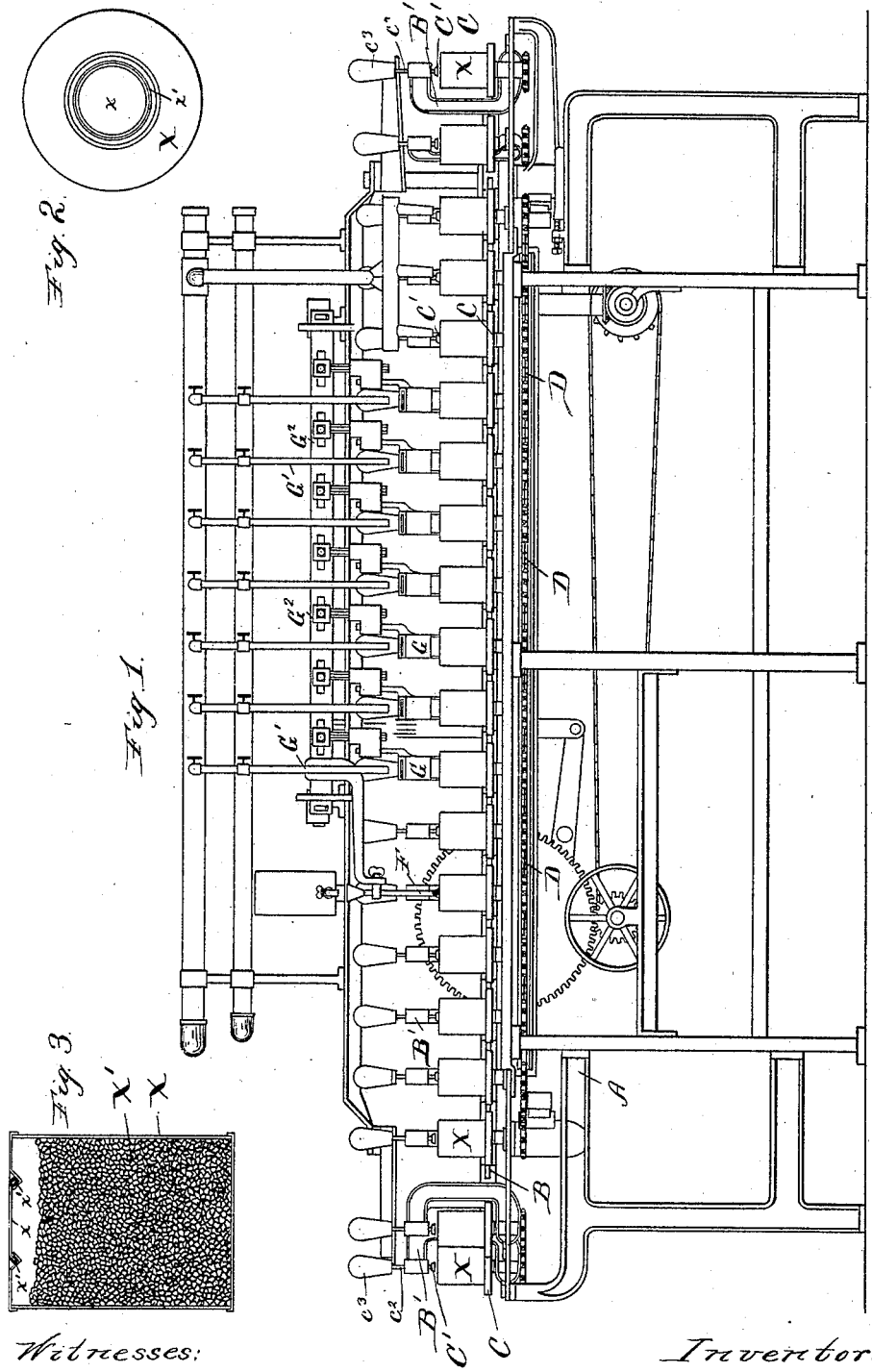

UNITED STATES PATENT OFFICE.

EDWIN NORTON, OF MAYWOOD, ASSIGNOR TO HIMSELF, AND OLIVER W. NORTON, OF CHICAGO, ILLINOIS.

ART OF SOLDERING CAPS ON FILLED CANS.

SPECIFICATION forming part of Letters Patent No. 395,796, dated January 8, 1889.

Application filed October 31, 1888. Serial No. 289,612. (No model.)

*To all whom it may concern:*

Be it known that I, EDWIN NORTON, a citizen of the United States, residing in Maywood, in the county of Cook and State of Illinois, have invented a new and useful Improvement in the Art of Soldering Caps on Filled Cans, of which the following is a specification.

My invention relates to improvements in the art or process of soldering the caps or final heads on cans filled with cooked or partially-cooked materials.

Heretofore it has been customary to provide the can-caps with vent-holes to permit the heated air, steam, or gases to escape therethrough during the process of soldering up the annular seam which unites the can-cap to the can-head, because otherwise the pressure of air, gas, or steam produced in the can during the soldering operation by the act of heating the joint and melting or flowing the solder around the same will cause the hot air, steam, or gas to escape through the melted or liquid solder which flows the seam, and thus produce minute apertures, technically called "pin-holes," in the soldered joint; and though these leaks or apertures are often so fine that they cannot be distinguished without the aid of a microscope, they are sufficient to cause the contents of the can to ferment and spoil; and heretofore after the can-cap has been soldered on the next step is to solder up the vent-hole in the can-cap, after which the can is put through the ordinary final cooking or processing steps. Heretofore, also, in order to prevent the vent-holes from being stopped up during the soldering operation by pressure of the contents of the can against the same it has been customary to provide the under side of the can-cap with a vent protector or shield to keep the contents of the can away from the vent-hole. Great difficulty is experienced, also, in soldering up these vent-holes, so much so that quite a large percentage of the average loss of goods to the canner is due to defectively-soldered vent-holes.

It is the object of my invention to provide a method or process of soldering the caps on filled cans whereby the expense and labor incident to soldering up the vent-holes and the loss of goods due to defectively-soldered vent-holes, as well as the cost incident to furnishing the can-caps with vent-hole protectors, may be entirely avoided and at the same time produce perfect soldered joints, free from all leaks or pin-holes.

I have discovered, and herein my invention consists, that can-caps having no vent-holes may be successfully and perfectly soldered upon filled cans by gradually heating the joint or can-cap by subjecting it to the action of successive soldering tools or heaters, so that heated air or gas may have opportunity to escape before the soldering operation is completed, the pin-holes or apertures which may be produced in the flowed solder of the seam by the escape of hot air, steam, or gas therethrough during the first part of the soldering operation being effectually destroyed or removed by the successive and final steps of the gradual or successive soldering operation.

In practicing my invention I apply the solder to the seam in the form of a suitable solder ring, with which the can-cap is hemmed, so that the solder is distributed with perfect evenness and regularity to every part of the seam before it is even melted or flowed, and this materially aids in the process. By this means or in this way I find that ventless can-caps may be as certainly and perfectly soldered upon every can as has been heretofore done by the much more laborious and expensive process of providing the can-caps with vent-holes and vent-protectors and subsequently soldering up the vent-holes, and all the solder, time, and labor required in soldering up the vent-holes are entirely dispensed with.

In the accompanying drawings, which form part of this application, and in which similar letters of reference represent like parts, I have shown for the better description and explanation of my invention, at Figure 1, a side elevation of an automatic can-cap-soldering machine which may preferably be used in practicing my invention. Fig. 2 is an end view of the can, showing the ventless can-cap; and Fig. 3 is a central section of the can.

The construction and operation of the machine shown in the drawings are well known to those skilled in the art. For a full description of the machine reference is made to the prior patents, No. 340,148, dated April 20, 1886, and No. 379,976, dated March 27, 1888.

In the drawings, A represents the frame of the machine, B the can-carrier, and B' the can-holder brackets or frames on the can-carrier.

C and C' are the can-holder disks or clamps, between which the cans X are held and by which they are revolved during the soldering operation, the spindle of the lower disk, C, being furnished with a gear engaging a chain, D, for revolving the same. The spindle $c^2$ of the upper can-holder disk, C', is mounted to slide and revolve freely in its bracket B', and it is furnished with a weight, $c^3$, which serves to press the holder-disk down upon the can-cap $x$ with sufficient force to clamp the cap firmly in place on the can X.

F is the fluxing or aciding device.

G is a series of heaters or soldering-tools mounted on a vertically-movable bar, $G^2$, and heated by gas-jets G'.

The can-carrier B moves intermittently, so that each can X therein is successively presented to and acted upon by each heater or soldering-tool G in turn, and the seam thus gradually heated and soldered, so that the gas or air pressure in the can produced by contact of the hot tools with the can cap and head may have an opportunity to escape before the soldering operation is completed.

The can-caps $x$ are hemmed or furnished with solder rings $x'$. These solder-hemmed can-caps are fully shown and described in my patent, No. 364,663, of June 14, 1887, to which reference is hereby made for a full description of the same. The can-cap $x$ has no vent-hole, and by this process of gradually heating and soldering the joint by successive steps as perfect a soldered seam may be produced upon a filled can as heretofore has been done by use of vented caps.

X' represents the contents of the can.

Each can is preferably soldered in about six successive steps, though the number of successive steps or soldering-tools may be varied without departing from the principle of my invention.

I claim—

1. The process of closing filled cans, consisting in placing ventless can-caps having their edges hemmed with solder on the cans and then heating and soldering the joint gradually by a series of successive steps, substantially as described.

2. The process of closing filled cans, consisting in placing ventless caps on the cans and then heating and soldering the joint by a series of successive steps, so that the air and gases under pressure produced during the first part of the heating and soldering operation may escape through the joint before the soldering thereof is completed, substantially as specified.

EDWIN NORTON.

Witnesses:
 EDMUND ADCOCK,
 JOHN W. MUNDAY.